3,217,021
ZINC PENTACHLOROBENZYL MERCAPTIDE
Francis E. Lawlor, Torrance, Calif., and Ivan C. Popoff, Ambler, Pa., assignors to Pennsalt Chemicals Corporation, Philadelphia, Pa., a corporation of Pennsylvania
No Drawing. Filed June 15, 1964, Ser. No. 375,348
1 Claim. (Cl. 260—429.9)

This application is a continuation-in-part of Serial No. 199,262, filed June 1, 1962, now abandoned.

This invention relates to the zinc salt of pentachlorobenzyl mercaptan which is useful as an agricultural chemical, particularly as a plant response agent (e.g., a herbicide) and as an animal repellent. The effectiveness of zinc pentachlorobenzyl mercaptide as a rodent repellent is surprising in view of the fact that other pentachlorobenzyl mercaptan salts, as for example, the related mercury salt, are entirely inactive for this purpose. This surprising effect will be illustrated in the examples illustrating the invention.

The preparation of zinc pentachlorobenzyl mercaptide is relatively simple and is preferably carried out by first preparing the isothiuronium salt of pentachlorobenzyl mercaptan. This is accomplished readily by reacting a pentachlorobenzyl halide with thiourea, the reaction being carried out at temperatures of about 50–100° C. in solvents having some solubility for both reactants. Generally the reaction solution is simply refluxed for a time sufficient to complete the reaction and then the precipitated crystalline product is filtered off. Solvents for the reaction are preferably alcohols, such as methanol, ethanol and isopropanol. Other useful solvents for the reaction are ketones such as acetone and methyl ethyl ketone and ethers such as di-isopropyl ether and the like. The isothiuronium salt thus formed is converted to the free mercaptan simply by hydrolyzing it with alkali, such as sodium hydroxide to first convert it to the alkali metal salt of the pentachlorobenzyl mercaptan and then the mercaptan is precipitated for isolation, if desired, by neutralizing the alkali metal salt with acid. The pentachlorobenzyl mercaptan may be converted to its zinc salt by reacting a water-acetone solution of the mercaptan with a water soluble zinc salt whereby the insoluble zinc pentachlorobenzyl mercaptide compound is precipitated from solution.

Alternatively the pentachlorobenzyl mercaptan may be obtained directly by reaction of pentachlorobenzyl chloride with sodium hydrosulfide in alcohol and under conditions of heat and pressure. In either reaction yields are good, being of the order of about 90%.

The zinc salt of pentachlorobenzyl mercaptan is a white crystalline product which decomposes at 280° to 285° C. It is insoluble in water, but is dispersable in aqueous and organic systems.

The novel compounds of the present invention are particularly useful as agricultural chemicals and are of interest as rodent repellents and as plant response agents acting as herbicides. In application to agricultural products the compounds may be applied as dusts or as powder compositions, whereby they are admixed with such materials as talc, pearlite, various clays, fuller's earth, diatomaceous earth and the like. The products are applied to plants with the usual standard applicators using standard techniques. For spray applications the compounds may be dispersed in water or other suitable liquid and carriers may be added with or without wetting agents such as sulfated alcohols, alkylated aromatic sulfonic acids, amino soaps, and the like. Where adherence properties need to be improved, gums such as karaya gum may be added to increase the adherence of the composition to the foliage. The amount to be used in applying to the plant is dependent upon the nature of the plants to be controlled, the time of the year, the surrounding vegetation, the presence or absence of other materials such as surface active agents, diluents, carriers and the like, and the amount of finish spray or dust to be applied per acre. No general rule can be set up since each case presents individual problems, but it may be stated that the zinc pentachlorobenzyl mercaptide is active in very small amounts and that there is little or no deleterious effect due to unusually large concentrations.

When using the zinc pentachlorobenzyl mercaptide as a rodent repellent it may be used in numerous ways depending on the specific article or area to be treated.

In the case of packaged goods, such as packaged foods, it is expedient to treat the wrapping or packaging material with active compounds, and this may be done either before or after the article is packaged. Alternatively, the package may be provided with a liner that has been treated with the compound, or tapes containing the repellent compound may be pasted over areas( particularly the corners) of the packages which are particularly accessible to rodents.

Likewise, the compound of this invention may be used to protect ropes in use or in storage, insulating materials and other materials of construction, etc., which materials are often damaged by rodents during storage and use.

The compound may also be used to discourage rodents from remaining in a particular area even though they do not cause physical damage. The presence of rodents is undesirbale for a number of reasons including the filth and disease which they spread, the disturbances they cause, etc., and by the use of the repellent compounds of this invention such adverse effects of rodents may be alleviated.

When large areas are to be protected a coating containing the repellent compound may be painted in the area of the compound may be distributed by dusting the powder or spraying a liquid formulation. Other means of application may be used as will become apparent from the following examples and discussion.

Formulations contaning the repellent may be used to coat or impregnate materials including woven and non-woven cellulosic articles (such as paper, cardboard, wood, sisal, hemp, etc.), textiles such as cottons and other natural cellulosic-containing materials, regenerated cellulosic fibers and the like. Likewise woolens and other proteinaceous materials may be protected and other synthetics, including woven and non-woven polyamides, polyacrylonitriles, polyacrylates, etc. may be protected by means of the invention.

The compound will also be of great value in agricultural and forestry applications to protect various seeds, tree seeds and tree seedlings from rodents and browsing animals. The compound may be used to protect fruit and forest trees from damage caused by deer and from bark injury from wild mice and rabbits. The compound also has a repellent effect on birds, and when seeds are treated with the compound and broadcasted, their consumption by birds is mitigated.

Suitable treatment of various products may also be achieved by coating or impregnation, by spraying roller application, paper deposition, brushing, dipping and the like. In some applications, as for example in making paper, the agent may be included in the beater pulp during manufacture. In a similar fashion, resinous sheeting such as polyvinyl alcohol and polyvinyl acetate sheets may be protected by adding the compound prior to polymerization.

Likewise the agent may be included in paints, shellac, varnishes and the like at a repellent concentration which will not, of course, interfere with the film-forming characteristics of the formulations. Likewise, mortar, concrete, etc. may be treated to produce rodent repellent effects.

The repellent compound may also be formulated in a water base with carriers such as starches, e.g., potato starch and corn starch, methyl cellulose, casein, various polymerizable monomers and copolymers such as styrene, methyl methacrylate, vinyl chloride, vinyl chloride-vinyl acetate, high suspension clays and the like.

Solid formulations such as dusts for the repellent compound are also useful and these may be prepared by spraying a solution of the compound onto a highly absorptive material such as highly absorptive silica or by mixing the pulverized compound with a diluent in a suitable blender. Addition of other finely divided materials such as chalk, calcium carbonate, talc, sodium silicate, wood flour, calcium silicate diatomaceous earths, etc. are also useful as additives to provide a more dilute composition when desirable. It is also possible to grind the compound and solid carrier together in a hammer mill or other grinding apparatus to provide a solid dust-like formulation or a finely divided concentrate that can be suspended in water for application as a suspension.

The concentration at which the active compounds may be used will vary widely, but a concentration will usually be selected to provide an ultimate concentration of up to about 50 mg. of compound per square inch of exposed surface (that is, the surface being protected). Surfaces containing as little as 1 mg. or less per square inch may be satisfactory for some applications. In general, however, compositions containing from about 0.5 to 25% by weight of the compound generally suit the requirements for obtaining effective repellency. Where tree seedlings, shrubs, trees or other plants are to be protected, the amount of agent will usually be between about 1 and 20 pounds of active ingredient per 100 gallons of treating solution or suspension which may be applied by spraying, dipping and the like.

The zinc salt of pentachlorobenzyl mercaptan will normally be sold in commerce as a liquid formulation of about 10% to 40% by weight active ingredient, the balance being an inert aqueous carrier containing one or more dispersing agents. In application, this commercial product is diluted to the desired concentration and sprayed or brushed onto the articles to be protected. Dip applications, particularly for bundles of forest or fruit tree planting stock are also useful and will be employed by the nurseryman.

EXAMPLE 1.—PREPARATION OF PENTACHLOROBENZYL MERCAPTAN

A mixture of 600 g. (2 moles) of pentachlorobenzyl chloride and 152 g. (2 moles) of thiourea were refluxed and stirred for two hours in 8 liters of isopropyl alcohol. The reaction mixture was filtered at room temperature and the filter cake was washed with methanol and dried at about 100° C. to obtain 677 g. (90% yield) of crude, S-pentachlorobenzylisothiuronium chloride having a melting point of 284–287° C. with decomposition. The product was recrystallized from 95% ethanol after which it melted with decomposition at 286–287° C.

A mixture of 100 g. (0.267 mole) of S-pentachlorobenzylisothiuronium chloride and 43 g. (1.07 moles) of sodium hydroxide was stirred in 3 liters of water for 3 hours at 85 to 90° C. The hot reaction mixture containing the sodium salt of pentachlorobenzyl mercaptan was filtered and the filtrate was acidified with dilute sulfuric acid. A precipitate formed and was filtered, washed with water and dried to obtain 68 g. (86% yield) of pentachlorobenzyl mercaptan having a melting point of 92–94° C. The pentachlorobenzyl mercaptan product was insoluble in water but soluble in hexane, acetone, benzene, ether and ethanol. After recrystallization from 95% ethanol the product melted at 92–94° C. and analyzed as follows.

Found: 28.49% C, 1.32% H, 59.31% Cl, 10.50% S.
Calculated: 28.36% C, 1.02% H, 59.81% Cl, 10.82% S.

EXAMPLE 2.—PREPARATION OF ZINC PENTACHLOROBENZYL MERCAPTIDE

A warm solution (35° to 40° C.) of 16.3 g. (0.075 mole) of zinc acetate dihydrate in a mixture of 70 cc. of water, 200 cc. of acetone and 2 cc. of acetic acid was added to a warm solution of 44 g. (0.148 mole) of pentachlorobenzyl mercaptan in 500 cc. of acetone. A precipitate formed which was filtered, washed with acetone and dried to obtain 45 g. (92.5% yield) of zinc pentachlorobenzyl mercaptide. This product was white crystalline material which decomposed at 280–285° C. It analyzed as follows.

Found: 26.0% C, 1.0% H, 9.5% S, 53.4% Cl, 10.9% Zn. Calculated: 25.6% C, 0.6% H, 9.7% S, 54.0% Cl, 10.9% Zn.

EXAMPLE 3.—PREPARATION OF MERCURIC PENTACHLOROBENZYL MERCAPTIDE

A solution at about 30° to 40° C. of 24 g. (0.075 mole) of mercuric acetate in a mixture of 50 cc. of water, 50 cc. of acetone and 2 cc. of acetic acid was added to 35° to 40° C. solution of 44 g. (0.148 mole) of pentachlorobenzyl mercaptan. The precipitate which formed was filtered, washed with acetone and dried to obtain 50 g. (85% yield) of mercuric pentachlorobenzyl mercaptide. The product was a white crystalline material which decomposed at 245–250° C.

EXAMPLE 4.—EVALUATION OF PRODUCTS AS REPELLENTS

Field mice (*Peromyscus maniculatus*) were offered 25 grams daily of wheat seed impregnated with a 2% preparation of zinc pentachlorobenzyl mercaptide in an anionic emulsifier as a sticking agent ("Carbopol" 934). Repellency at the end of ten days was indicated by the percentage of food rejected with observations on any toxicity to the test animal. It was found that the treated seed caused a rejection of 87.8% as compared with 0% on the untreated checks. This gives a repellency rating of 3 which is good compared with the highest repellency rating of 4 and the lowest rating of 0. No toxicity to the animals was noted.

EXAMPLE 5

Following the general details of Example 2, the test compounds were evaluated as indicated in the following Table I.

Table I.—*Repellent effects of pentachlorobenzyl mercaptan derivitives against* Peromyscus maniculatus

| Agent | Weight percent active ingredient on seed | Formulation preparation | Seed consumed | | Percent reduction in food intake | Percent mortality | |
|---|---|---|---|---|---|---|---|
| | | | 1st day | 10 days | | 1st day | 10 days |
| Zinc pentachlorobenzylmercaptide | 2 | Ground in mortar with water and sticking agent.[1] | 34 | 150 | 94 | None | None |
| Do | 4 | -----do----- | 62 | 18.5 | 89.6 | -------- | 40 |

[1] Emulsifiable polyethylene dispersed in water with emulsifying and dispersing agents.

EXAMPLE 6

Mercuric pentachlorobenzyl mercaptan as prepared in Example 3 was ground in a mortar with water and a sticking agent and this formulation used to treat wheat seed as described in Example 4. Field mice (Peromyscus) offered the seed showed no aversion to it and after ten days there was no repellency effects observed nor were there any toxic effects.

It will be understood that numerous changes may be made in the above description and examples without departing from the spirit and scope of the invention.

We claim:

Zinc pentachlorobenzyl mercaptide.

References Cited by the Examiner

UNITED STATES PATENTS

| 2,615,782 | 10/52 | Haefele | 167—87.1 |
| 2,765,345 | 10/56 | Pikl | 260—429.9 |
| 2,802,769 | 8/57 | Van Stryk et al. | 260—609 |

OTHER REFERENCES

Karrer: Organic Chemistry, Elsevier Publishing Co. (1938), p. 108.

TOBIAS E. LEVOW, *Primary Examiner.*